US008650492B1

(12) United States Patent
Mui et al.

(10) Patent No.: US 8,650,492 B1
(45) Date of Patent: Feb. 11, 2014

(54) SYSTEM AND METHOD FOR PAGE NAVIGATION VISUALIZATION AND ANALYSIS

(75) Inventors: Lik Mui, Hayward, CA (US); Peng Li, Bellevue, WA (US); Zhiting Xu, Redmond, WA (US); Hao Li, Bellevue, WA (US); Fenghui Zhang, Redmond, WA (US); Lin Liao, Bothell, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/271,214

(22) Filed: Oct. 11, 2011

(51) Int. Cl.
*G06F 15/177* (2006.01)

(52) U.S. Cl.
USPC .......................................................... 715/736

(58) Field of Classification Search
USPC ........................... 715/712, 734, 853, 855, 736
See application file for complete search history.

(56) References Cited

U.S. PATENT DOCUMENTS

| | | | |
|---|---|---|---|
| 5,751,956 A | 5/1998 | Kirsch | |
| 5,870,559 A | 2/1999 | Leshem et al. | |
| 6,275,862 B1 | 8/2001 | Sharma et al. | |
| 6,308,210 B1 | 10/2001 | Fields et al. | |
| 6,781,599 B2 | 8/2004 | Abello et al. | |
| 7,035,926 B1 | 4/2006 | Cohen et al. | |
| 7,043,702 B2 | 5/2006 | Chi et al. | |
| 7,165,105 B2 | 1/2007 | Reiner et al. | |
| 7,305,622 B2 * | 12/2007 | Cohen et al. | 715/736 |
| 7,644,375 B1 | 1/2010 | Anderson et al. | |
| 7,676,465 B2 | 3/2010 | Poola | |
| 7,707,229 B2 | 4/2010 | Tiyyagura | |
| 7,792,843 B2 | 9/2010 | Iverson | |
| 7,792,844 B2 | 9/2010 | Error et al. | |
| 7,917,382 B2 | 3/2011 | Cereghini et al. | |
| 7,958,189 B2 | 6/2011 | Bernstein | |
| 8,010,657 B2 | 8/2011 | Hall et al. | |
| 2003/0023715 A1 | 1/2003 | Reiner et al. | |
| 2003/0115333 A1 | 6/2003 | Cohen et al. | |

(Continued)

FOREIGN PATENT DOCUMENTS

| | | |
|---|---|---|
| KR | 10-2003-0088636 | 11/2003 |
| WO | WO-01/57706 | 8/2001 |
| WO | WO-2004/003701 | 1/2004 |

OTHER PUBLICATIONS

Howard, Jennifer, "Citation by Citation, New Maps Chart Hot Research and Scholarship's Hidden Terrain", The Chronicle of Higher Education, Sep. 11, 2011, 8 pages.

(Continued)

*Primary Examiner* — Stephen Hong
*Assistant Examiner* — Terri Filosi
(74) *Attorney, Agent, or Firm* — Foley and Lardner LLP; John D. Lanza (57) ABSTRACT

Systems and methods for generating a navigation flow visualization of network traffic. The system and method configured to receive user input that identifies a node that is a grouping of network resources. Generating a visualization data of network traffic flowing into the identified node from the incoming nodes and displaying the network traffic flowing out of the identified node to the outgoing nodes. The method includes connecting the incoming nodes with the identified node using the connectors, the connectors having a width dimension that indicates a number of visits from the incoming nodes to the identified node. The method includes connecting the identified node with the outgoing nodes using the connectors that has a width dimension that indicates a number of visits from the identified node to the outgoing nodes.

11 Claims, 7 Drawing Sheets

(56) References Cited

U.S. PATENT DOCUMENTS

| | | | |
|---|---|---|---|
| 2003/0131097 A1* | 7/2003 | Kasriel et al. | 709/224 |
| 2004/0174397 A1* | 9/2004 | Cereghini et al. | 345/855 |
| 2004/0196311 A1 | 10/2004 | Cadez et al. | |
| 2006/0149728 A1* | 7/2006 | Error et al. | 707/5 |
| 2006/0277212 A1 | 12/2006 | Error | |
| 2007/0280113 A1* | 12/2007 | Ninan et al. | 370/235 |
| 2008/0181463 A1 | 7/2008 | Error | |
| 2008/0201357 A1 | 8/2008 | Error et al. | |
| 2009/0070366 A1 | 3/2009 | Zhao et al. | |
| 2009/0083421 A1 | 3/2009 | Glommen et al. | |
| 2011/0055710 A1 | 3/2011 | Kirkby et al. | |
| 2011/0167063 A1 | 7/2011 | Tengli et al. | |
| 2012/0290920 A1 | 11/2012 | Crossley | |

OTHER PUBLICATIONS

D. Edler & M. Rosvall (2010), Load and Simplify Network, Alluvial Generator, printed on Nov. 8, 2011, retrieved from internet URL: www.mapequation.org/alluvialgenerator/index.html, 6 pages.

Mapping Science, Eigenfactor.org, printed on Nov. 9, 2011, retrieved from internet URL: http://www.eigenfactor.org/map, 1 page.

Overview, Eigenfactor.org, printed on Nov. 9, 2011, retrieved from internet URL: http://www.eigenfactor.org/methods.php, 1 page.

Psychological Bulletin (1997), Eigenfactor.org, retrieved from internet URL: http://well-formed.eigenfactor.org/img/shots/change_02.png, 1 page.

Rosvall et al., PLoS ONE : Mapping Change in Large Networks, Jan. 27, 2010, 13 pages.

Title: Unica Netinsight Source Unica.com [online], [retrieved on Sep. 23, 2011] Retrieved from <URL:http://www.unica.com/documents/us/Unica_ProSheet_NetInsight_1209.pdf>.

Visual Sciences: Path Analysis using Path Browser by "Paul" [online], [retrieved on Dec. 28, 2009] Retrieved from http://webanalyticssimplified.blogspot.com/ <URL: http://webanalyticssimplified.blogspot.com/2009/12/visual010sciencespath010analysis010using.html>.

Coremetrics—IBM WebSphere Portal Analytics, Best Practices Overview, Aug. 2009, 20 pages.

IBM Coremetrics Web Analytics User Guide, Jun. 15, 2011, 122 pages.

Li et al., Entropy-Based Criterion in Categorical Clustering, Proceedings of the 21st International Conference on Machine Learning, Banff, Canada, 2004, 8 pages.

Metronome Labs, Products:Metronome Explain, Mar. 27, 2010, 2 pages.

PCT/US/20120059569 International Search Report/Written Opinion, DTD Mar. 19, 2013, 8 pgs.

Title Lockdown Media, Source http://netscale.cse.nd.edu/, URL: http://netscale.cse.nd.edu/twiki/bin/,view/Main/LockdownMedia, Dec. 11, 2010 is the date of this article.

US Office Action on U.S. Appl. No. 13/271,188 DTD May 13, 2013.
US Office Action on U.S. Appl. No. 13/271,191 DTD Jun. 19, 2013.
US Office Action on U.S. Appl. No. 13/271,222 DTD Jul. 16, 2013.

* cited by examiner

SYSTEM AND METHOD FOR PAGE NAVIGATION VISUALIZATION AND ANALYSIS

BACKGROUND

The Internet provides access to a wide variety of content. For instance, images, audio, video, and web pages for many different topics are accessible through the Internet. Website owners that provide access to content want to gain insight regarding the performance of various web pages within their website. However, due to growing complexity, a single website can have hundreds or thousands of web pages.

The amount of traffic information available regarding even a basic Internet transaction can be cumbersome to process for the interested parties. Users may visit numerous, different uniform resource locators (URLs), to complete substantially the same types of transactions. For example, the website owners may wish to know more about the number of users that actually add a product to an online shopping cart. However, a unique URL may be generated each time a user adds a product to a shopping cart. In addition, various parties may be interested in how users arrive or depart from certain webpages. For example, one user may perform an Internet search for a specific product, while another user may follow an advertisement link, to arrive at the same product description page. Therefore, the number of traffic paths that users may follow may also be large. For these and other reasons, generating visualizations of the flow of Internet or network traffic is challenging and difficult.

SUMMARY

In general, one aspect of the subject matter described in this specification can be embodied in a method for displaying Internet network traffic data. The method includes systems and methods for generating a navigation flow visualization of network traffic. The system and method if configured to receive user input that identifies a node that is a grouping of one or more network resources. The method includes generating a visualization data of network traffic flowing into the identified node from the incoming nodes and displaying the network traffic flowing out of the identified node to the outgoing nodes. The method includes connecting the incoming nodes with the identified node using one or more connectors, the connectors having a width dimension that is representative of a number of visits from the incoming nodes to the identified node. The method includes connecting the identified node with the outgoing nodes using the connectors that have a width dimension that is representative of a number of visits from the identified node to the outgoing nodes.

A further implementation is one or more computer-readable media having instructions stored therein. The instructions are executable by one or more processors to cause the one or more processors to perform operations. The operations include receiving user input that identifies a node that is a grouping of one or more network resources. In one implementation the operation includes generating a visualization data of network traffic flowing into the identified node from one or more incoming nodes and displaying the network traffic flowing out of the identified node to one or more outgoing nodes. In one implementation, one or more incoming nodes may be connected with the identified node using one or more connectors, the one or more connectors having a width dimension that is representative of a number of visits from the one or more incoming nodes to the identified node. In another implementation, the identified node may be connected to the one or more outgoing nodes using one or more connectors that has a width dimension that indicates a number of visits from the identified node to the one or more outgoing nodes. In yet another implementation, the user may be allowed to add incoming nodes with network traffic flowing to the incoming nodes and allowing the user to add additional outgoing nodes with network traffic flowing out of the outgoing nodes.

These implementations are mentioned not to limit the scope of the disclosure, but to provide examples to aid in the understanding thereof. Particular implementations can be developed to realize one or more of the following advantages.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Navigation visualization provides a graphical representation of Internet or network traffic going into and out of a user chosen node. Each node represents one or more web pages that have been grouped together. A connector may be used to connect two nodes. The relative size of each connector that connects two nodes represents the relative amount of the traffic that traveled from one node to the other node or one webpage to another. The connectors may represent the amount of Internet or network traffic and/or other metrics. User interactions clicking or hovering over a node or an edge and segmenting the traffic are clearly defined to surface the exit pages, conversion rates, and other relevant data in an interactive way.

The navigation visualization allows the website owner to choose the starting or ending node and visualize the traffic going into or out of the chosen node. Moreover, the website owner may add certain webpages to the node manually. A website owner may specify whether they wanted to add webpages to the node or remove webpages from the node. A user may further add more nodes to each side of the navigation visualization. Thus, the user may add nodes that have traffic to and from the user identified node. On many occasions, a user may want to see traffic that goes into a node and the traffic that comes out of a node and which other nodes or websites the users that are represented by the traffic visit after passing through the node.

Insight into the flow of Internet or network traffic can be beneficial to website owners, advertisers, and other interested parties. For example, traffic data may include information as to how a user arrives at a website (e.g., by starting their web browsing at the website, by following a hyperlink from another website, etc.), how a user navigates within the website (e.g., by traversing from a product information page to a shopping cart page, by traversing from a shopping cart page to a purchase page, etc.), and where users go after visiting the website (e.g., by clicking on advertisements, by navigating to other websites, etc.). Interested parties can use traffic information to make changes to the website, tailor an advertising campaign a certain way, and perform other functions.

Interested parties (e.g., advertisers, website administrators, and other parties) may access various reports and visualizations that convey information regarding user interactions with the content and the flow of traffic through certain websites. A traffic analysis tool may aggregate and display traffic data, to assist an interested party in discerning how users interact with various webpages. For example, an advertiser may wish to know the percentage of users that actually click on an advertisement or how many users actually complete a purchase of the advertised product. The analysis and reporting of the traffic data can enable an advertiser to make advertising budget allocation decisions. In another example, a website administrator may make changes to the website that lead to a greater number of users reaching certain pages or goal of a website.

In particular, the analysis tool may operate to simplify the presentation of information to an interested party about the flow of traffic. To do so, the analysis tool may aggregate and group certain types of information into "nodes" in the visualization. In some implementations, displayed nodes may be "clusters" of URLs and the data relating to the URLs may be aggregated. For example, URLs associated with viewing a shopping cart may be aggregated into a single cluster for display on a traffic flow visualization. In another example, other types of URLs within a particular website may be clustered (e.g., a main page, a search page, etc.) and the traffic or the number of visits between these URLs may also be aggregated. In further implementations, other types of information can similarly be aggregated and grouped into nodes for a traffic flow visualization (e.g., demographic information, geographic location information, information about the hardware or software used to access websites, etc.). In another implementation, the nodes may be grouped by determining the uniform resource locator prefix based on a portion of the uniform resource locator item common to the plurality of flow paths representing web page visits.

The analysis tool may also automatically determine which nodes and flows of traffic are displayed in a visualization, according to various implementations. Aggregated flows of traffic among nodes may still be difficult to follow for a user of the visualization. In some implementations, the analysis tool may use a scoring function to determine whether or not certain paths of traffic are displayed in a traffic flow visualization.

Figure 1:
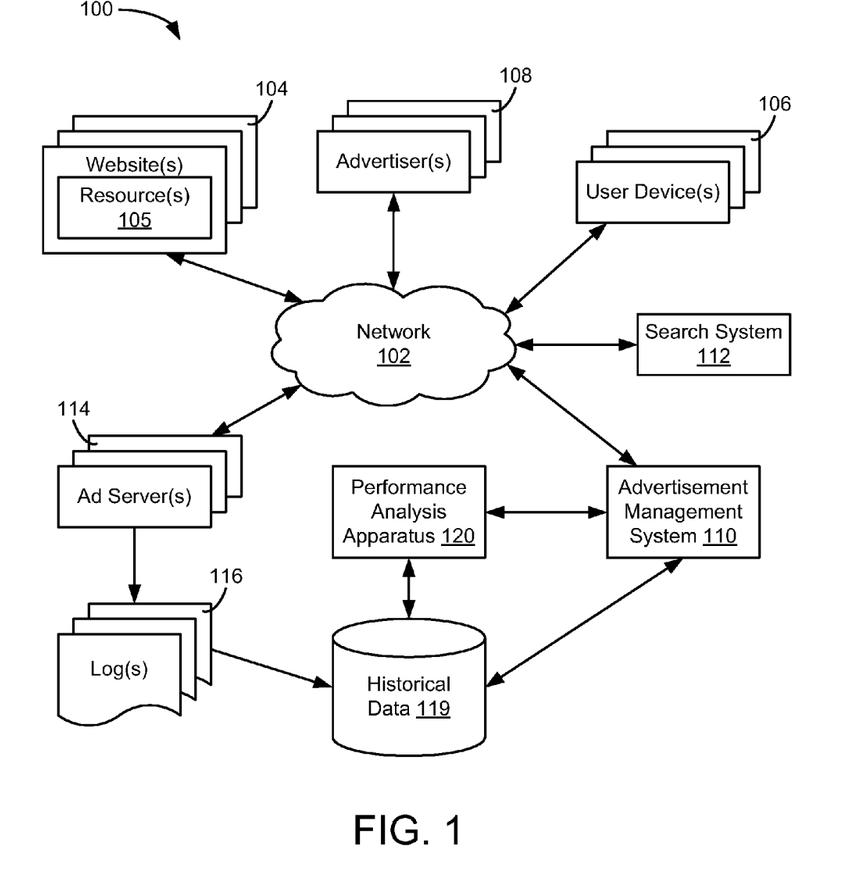
FIG. 1 is a block diagram of an example environment in which a data management system manages historical user visits in accordance with an illustrative implementation.

FIG. 1 is a block diagram of an example environment 100 in which an advertisement management system manages advertising services. Environment 100 includes a network 102, such as a local area network (LAN), a wide area network (WAN), a wireless network, the Internet, or a combination thereof. Network 102 connects websites 104, user devices 106, advertisers 108, and an advertisement management system 110. Environment 100 may include any number of websites 104, user devices 106, and advertisers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts.

A resource 105 is any data that can be provided over network 102. The resource 105 is identified by a resource address that is associated with resource 105, such as a URL. Resources 105 can include web pages, word processing documents, portable document format (PDF) documents, images, video, programming elements, interactive content, and feed sources, to name only a few. Resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages, such as, JavaScript® or ECMAScript®.

A user device 106 is an electronic device that is under control of a user and is capable of requesting and receiving resources 105 over network 102. Example user devices 106 include personal computers, mobile communication devices, and other devices that can send and receive data over network 102. In some implementations, user device 106 may includes a user application, such as a web browser, to facilitate the sending and receiving of data over network 102.

User device(s) 106 can request resources 105 from a website 104. In turn, data representing resource 105 can be provided to user device 106 for presentation by user device 106 (e.g., on an electronic display, as an audible sound via a speaker, or a combination thereof). The data representing resource 105 can include data specifying a portion of the resource or a portion of a user display (e.g., a presentation location of a pop-up window or in a slot of a web page) in which advertisements can be presented. These specified portions of resource 105 or user display are referred to as advertisement slots.

To facilitate searching of the vast number of resources 105 accessible over network 102, environment 100 may include a search system 112 that identifies resources 105 by crawling and indexing resources 105 provided on websites 104. Data about resources 105 can be indexed based on resource 105 with which the data is associated. The indexed and, optionally, cached copies of resources 105 are stored in a search index (not shown).

User devices 106 can submit search queries to search system 112 over network 102. In response, search system 112 accesses the search index to identify resources 105 that are relevant to the search query. In one illustrative embodiment, a search query includes one or more keywords. Search system 112 identifies resources 105 that are responsive to the query, provides information about resources 105 in the form of search results and returns the search results to the user devices 106 in search results pages. A search result can include data generated by search system 112 that identifies a resource 105 that is responsive to a particular search query, and can include a link to resource 105. An example search result can include a web page title, a snippet of text or a portion of an image extracted from website 104, a rendering of resource 105, and the URL of the website 104. Search results pages can also include one or more advertisement slots in which advertisements can be presented.

A search result page can be sent with a request from search system 112 for the web browser of user device 106 to set an HTTP (HyperText Transfer Protocol) cookie. A cookie can represent, for example, a particular user device 106 and a particular web browser. For example, search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifier can be anonymized and is not connected with user names. Because HTTP is a stateless protocol, the use of cookies allows an external service, such as search system 112 or other system, to track particular actions and status of a user over multiple sessions. A user may opt out of tracking user actions, for example, by disabling cookies in the browser's settings.

When a resource 105 or search results are requested by a user device 106 or provided to user device 106, advertisement management system 110 receives a request for advertisements to be provided with resource 105 or search results. The request for advertisements can include characteristics of the advertisement slots that are defined for the requested resource 105 or search results page, and can be provided to advertisement management system 110. For example, a reference (e.g., URL) to resource 105 for which the advertisement slot is defined, a size of the advertisement slot, and/or media types that are available for presentation in the advertisement slot can be provided to advertisement management system 110. Similarly, keywords (i.e., one or more words that are associated with content) associated with a requested resource 105 ("resource keywords") or a search query for which search results are requested can also be provided to advertisement management system 110 to facilitate identification of advertisements that are relevant to resource 105 or search query.

Based on data included in the request for advertisements, advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries. In some implementations, advertisements having targeting keywords that match the resource keywords, the search query, or portions of the search query are selected as eligible advertisements by advertisement management system 110.

Advertisement management system 110 selects an eligible advertisement for each advertisement slot of a resource 105 or of a search results page. Resource 105 or search results page is received by user device 106 for presentation by user device 106. User interaction data representing user interactions with presented advertisements can be stored in a historical data store 119. For example, when an advertisement is presented to the user via an ad server 114, data can be stored in a log(s) 116. Log(s) 116, as more fully described below, can be aggregated with other data in historical data store 119. Accordingly, historical data store 119 contains data representing the advertisement impression. For example, the presentation of an advertisement is stored in response to a request for the advertisement that is presented. For example, the ad request can include data identifying a particular cookie, such that data identifying the cookie can be stored in association with data that identifies the advertisement(s) that were presented in response to the request. In some implementations, the data can be stored directly to historical data store 119.

Similarly, when a user selects to traverse a link (e.g., a hyperlink, a presented advertisement, etc.), data representing the selection of the link can be stored in log(s) 116, a cookie, or historical data store 119. In some implementations, the data is stored in response to a request for a web page that is linked to an advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 106. In further implementations, additional information may be collected about a particular user. For example, additional information may include information relating to the user's demographics, geographic location (e.g., based on a GPS function in a mobile device, based on an IP address, etc.), system information (e.g., which web browser is being use, the type of computing device used, etc.), and any other type of information about a user's interaction with environment 100.

Log(s) 116, or historical data store 119, also store references to advertisements and data representing conditions under which each advertisement was selected for presentation to a user. For example, historical data store 119 can store targeting keywords, bids, and other criteria with which eligible advertisements are selected for presentation. Additionally, historical data store 119 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation.

Advertisers 108 can submit, to advertisement management system 110, campaign parameters (e.g., targeting keywords and corresponding bids) that are used to control distribution of advertisements. Advertisers 108 can access advertisement management system 110 to monitor performance of the advertisements that are distributed using the campaign parameters. For example, an advertiser can access a campaign performance report that provides a number of impressions (i.e., presentations), selections (i.e., clicks), and conversions that have been identified for the advertisements. The campaign performance report can also provide a total cost, a cost-per-click, and other cost measures for the advertisement over a specified period of time.

In some implementations, when a user accesses a web page, or another resource, from a referring web page (or other resource), the referring web page (or other resource) for that interaction can be identified, for example, by execution of code that is referenced by the web page being accessed and/or based on a URL that is used to access the web page. For example, a user can access an advertiser's website by selecting a link presented on a web page, for example, as part of a promotional offer by an affiliate of the advertiser. This link can be associated with a URL that includes data (i.e., text) that uniquely identifies the resource from which the user is navigating. For example, the link http://www.example.com/homepage/%affiliate_identifier%promotion_1 specifies that the user navigated to the example.com web page from a web page of the affiliate that is associated with the affiliate identifier number that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to facilitate performance reporting and visualizing the flow of traffic in environment 100.

Advertisement management system 110 includes a performance analysis apparatus 120 that may use traffic and other data stored in logs 116, historical data 119, or elsewhere, to generate one or more flow visualizations of traffic in environment 100. For example, performance analysis apparatus 120 may analyze cookie data to determine how many users traverse from one of websites 104 to another. In some implementations, performance analysis apparatus 120 may aggregate sets of data into nodes and/or traffic paths for the visualization. Performance analysis apparatus 120 may also determine which nodes and traffic paths are displayed in a traffic flow visualization. For example, performance analysis apparatus 120 may utilize one or more scoring functions based on the amount of traffic between nodes to determine which traffic paths are displayed. The scoring function may also be based on level weights. For example, each of the traffic paths going from nodes A to B to C may have a level weight of 1, whereas a path that traverses directly from A to C may have a level weight of 2.

Figure 2:
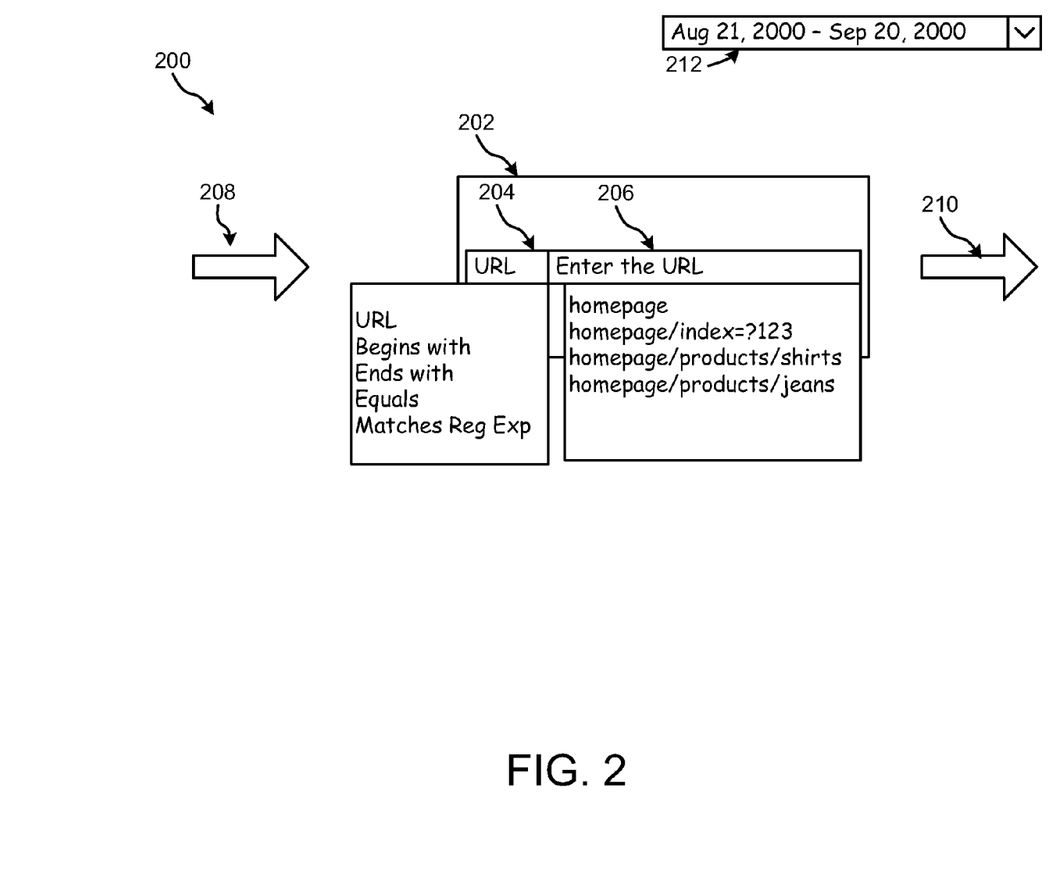
FIG. 2 is an illustration of an example menu that may be initially displayed for a user.

FIG. 2 is an illustration 200 of an example menu 202 that may be displayed for a user. The illustration 200 shows controls such as but not limited to, menu 202, allowing the user to choose the flow direction using inbound button 208 and outbound button 210, the menu 202 displays a drop box 204 and a text box 206. Flow direction includes choosing between showing the traffic that goes into the selected node selected using an inbound button 208 or showing outbound traffic using outbound button 210. The drop box 212 allows the user to enter a date range or allows the user to select a date range from a visual monthly and/or yearly calendar.

The user may choose from various filters from drop box 204. Some of the choices include, but are not limited to, a URL, begins with, ends with, equals, or matches regular expression or "reg exp". The filters may work in different ways such as the "begins with" and "ends with" filters may allow a user to search for URLs or resources that begins with or end with the text typed in the text box 206. Alternatively, the user may choose a regular expression filter and type a Boolean expression to search for resources or webpages.

The user can use a user input device to enter a URL in the text box 206. In one embodiment, the text box 206 may include an auto-complete feature. The auto-complete feature may access data relating to historical webpages that have been typed into the text box 204 and display a list of possible matches for the user. For example, if the user typed in "homep", the autocomplete feature may display a list that could include, "homepage", "homepage/index=?123", "homepage/products/shirts", "homepage/products/jeans" and so on. The auto-complete list may be determined based on searching all URLs associated with the user's account, or historic searches performed by the user. The auto-complete list may be stored on the user's computer or on a server computer.

Figure 3:
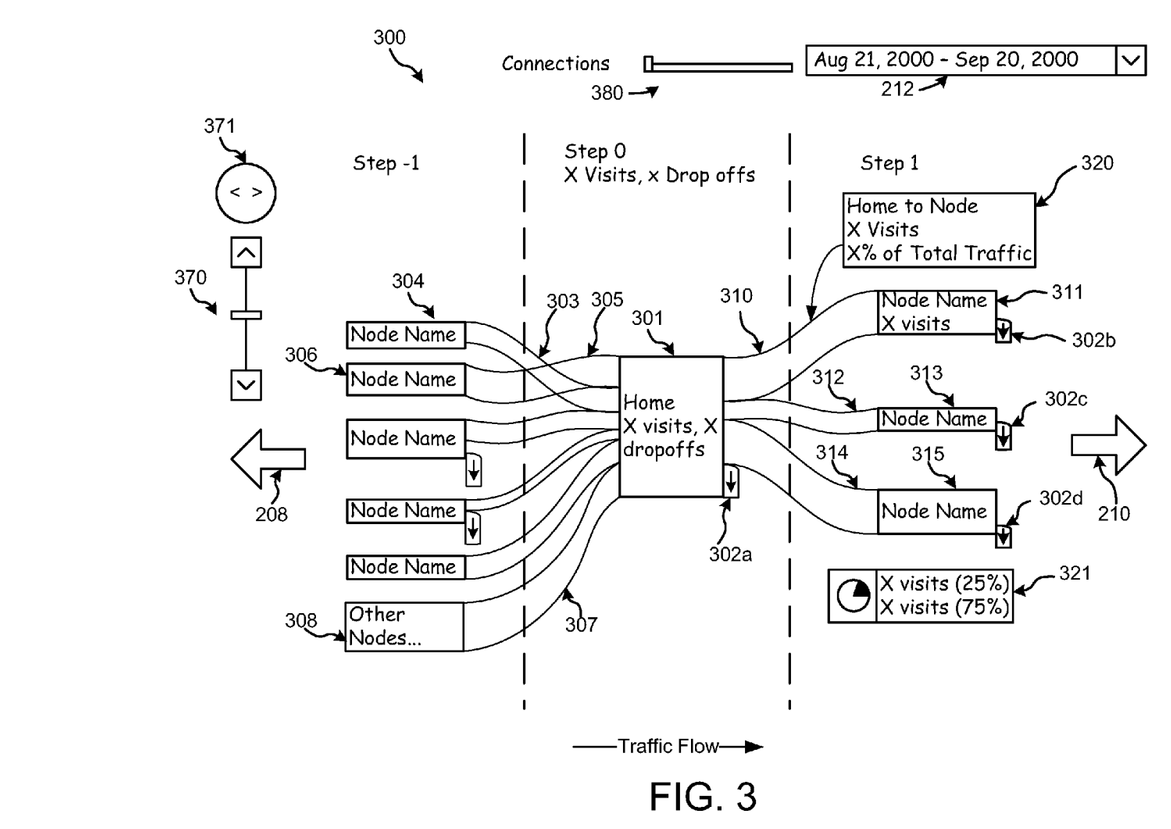
FIG. 3 is an illustration of an example visualization of online traffic from the user selected URL from the menu from FIG. 2.

FIG. 3 is an illustration of an example visualization 300 showing network traffic from the user selected URL from the menu from FIG. 2. For example a user may have entered a URL or other regular expression and selected a webpage or cluster of webpages (node). In this example, the user may have selected the outbound button 210 to display web traffic that is coming out of the selected webpage(s) or node. In another implementation, a user may select any node that is displayed on the screen and choose to see a visualization that is centered around that node, as discussed in greater detail below. Accordingly, there are at least two ways of accessing a single node centric visualization, first by typing in the URL in a menu as shown in FIG. 2, second by selecting a node and requesting that the node is used as the center node for a visualization.

Visualization 300 is a sankey or sankey type diagram as shown in FIG. 3. Sankey diagrams are the types of diagrams where the size and shape of the nodes and the connectors represents one or more data values. In this example implementation, the user selected node is displayed in the center of the visualization under the heading step 0. In visualization 300, home 301 is displayed at step 0. Within the node information regarding the node is displayed such as the number of visits the node had incoming and the number of visits where the users dropped off. The size of home 301 in the visualization reflects the amount of the traffic that came into home 301 and the amount of the traffic that went out of home 301. In an example implementation, the amount of traffic going into a node should be equal to the amount of traffic that is going out of a node.

Visualization 300 also displays traffic flow information between nodes. For example, connector 303 represents the flow of traffic from node 304 to home 301. In various implementations, visualization 300 may also provide indicia of the amount of traffic between nodes (e.g., by varying the appearance of traffic flows by traffic volume, by providing icons or text indicative of traffic volume, or by other ways of conveying the amount of traffic between nodes). For example, connectors 303 305 and 307 are shown to vary in size in visualization 300, thereby representing their different traffic volumes. Similarly, traffic paths 303, 305, and 307 represent the flow of traffic from node 304, 306, and 308 to home 301.

Visualization 300 may also show drop-off traffic flows. In general, a drop-off traffic flow is one in which a user exits the process (e.g., by stopping their web browsing session, by leaving to visit a different retailer's website, or by leaving to visit a website with a different top level domain, etc.). As shown, drop-off traffic paths 302a, 302b, 302c and 302d are attached to various nodes, to denote the flow of traffic away from each of these steps (e.g., that do not return to another node associated with a goal in visualization 200). In some implementations, drop-off traffic flows may include indicia that distinguishes them from other traffic flows (e.g., by applying a coloration, text or icon, etc.). For example, drop-off traffic path 302a may be colored red to denote the flow of traffic away from the home 301 (e.g., by going to a competitor's website, by stopping the shopping process, navigating away from the domain name of the visualization etc.). In other implementations, the length dimension of the drop-off traffic paths represents the amount of traffic that dropped off. For example, the length of drop-off 302a is larger than the length of drop-off 302d, accordingly, a larger amount of traffic dropped off from home 301 than node 315.

Visualization 300 is also shown to include time input 212, according to some implementations. Time input 212 is configured to receive a selection of a time or date range for which visualization 300 is to be generated. For example, time input 212 may receive a selection of a date range that can be used to filter traffic information provided by visualization 300. By way of example, an advertiser may wish to view website traffic information around a certain holiday, to tailor an advertising campaign. In other implementations, time input 212 may be preset (e.g., the previous week, the previous month, a time period defined in a user's profile, etc.).

Visualization 300 may also include zoom input 371, which receives a selection of a zoom level. For example, a user of visualization 300 may use zoom input 371 to zoom out, thereby showing more nodes. Zoom input 371 may also be used to zoom in, thereby focusing the display of visualization 300 on only a subset of nodes. Zoom input 371 may be one or more icons, a sliding bar, or other selectable area of visualization 300. The zoom input 371 may allow a user to enlarge the size of each node and connector that is shown in visualization 300. Visualization 300 may include a scroll input 370 which receives a selection of a scroll left or right inputs. For example, a user of visualization 300 may wish to scroll to a right or left portion of the visualization.

In some implementations, visualization 300 may include a connection selector 380. Connection selector 380 receives a selection of an amount of traffic flows to be displayed on visualization 300. As shown, connection selector 380 is set to display only a minimal amount of traffic flows on visualization 300. Connection selector 380 may be an input field that receives a number of flows to display, one or more icons (e.g., an up and down arrow), a slide bar, or any other selectable area for receiving a selection on visualization 300.

Visualization 300 also shows home 301 in one column that is labeled step 0 and the set of nodes (311, 313 and 315) that receive traffic from home 301 in a column labeled step 1. In this implementation, the nodes (e.g. 304, 306 and 308) have traffic going to home 301 are in another column labeled step −1. In this implementation, in any column there can be only a limited number of nodes. For example, in the column labeled step −1, there are a total of 6 nodes. The last node 308 is an aggregate of all websites that were not included in the 5 nodes above node 308. The nodes with the largest amount of traffic are shown and the nodes with smaller amount of traffic are consolidated in node 308. Accordingly, this feature allows the user to see the most significant nodes and connectors.

Visualization 300 allows the user to interact with each node and connector that is displayed in the visualization. For example, if a user input device hovers over the area occupied by the connector 310, the user may be shown a connector display 320 that states which nodes are being connected by the connector. The user pointing device hovering over connector 310 would display, home 301 to node 311 (i.e. the two nodes being connected by the connector). The connector display 320 also shows the number of visits that are represented by the connector (i.e. x visits) and the percent of total traffic that is represented by the connector 310. The total traffic for connector 310 would be the sum of the traffic from 301.

If the user pointing device hovers over a node such as node 315, node hover display 321 may be generated. The node hover display 321 may include the number of visits that dropped off and the percentage to the number of visits that dropped off. Also the number of visits and related percentage that went on to other nodes. For example, in visualization 300, 25% of the visit dropped off and 75% of the visits went to other nodes. Also shown in node hover display 321 is a graphical representation of the visits data. The graphical representation may be a pie chart, line graph or the like. A user may be provided with an option to modify the node hover display 321.

Figure 4:
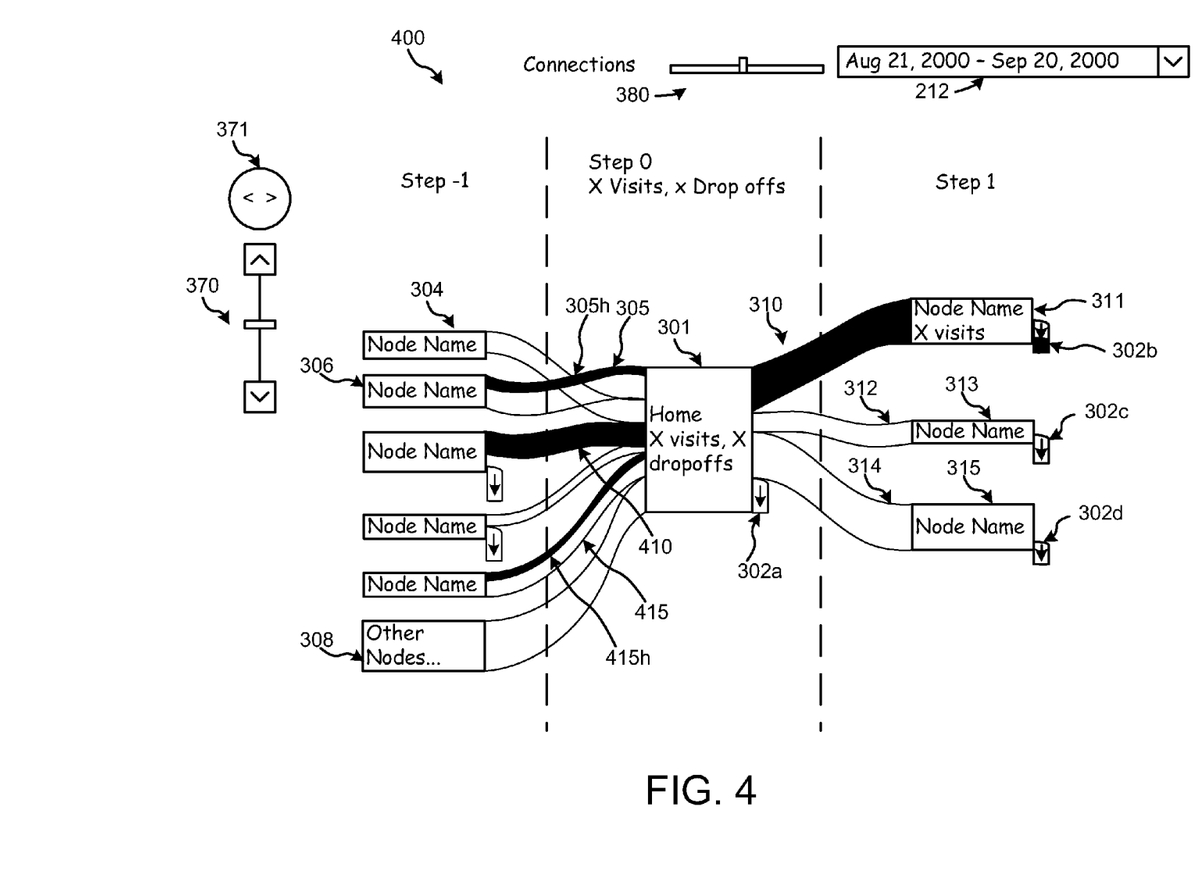
FIG. 4 is an illustration of an example visualization of a selected path from FIG. 3.

When a user selects a connector, the visualization highlights various connectors with traffic that traveled through the selected connector. For example, when a user selects connector 310, all other connectors that have traffic that passed through connector 310 may be highlighted. (See. FIG. 4)

Figure 5:
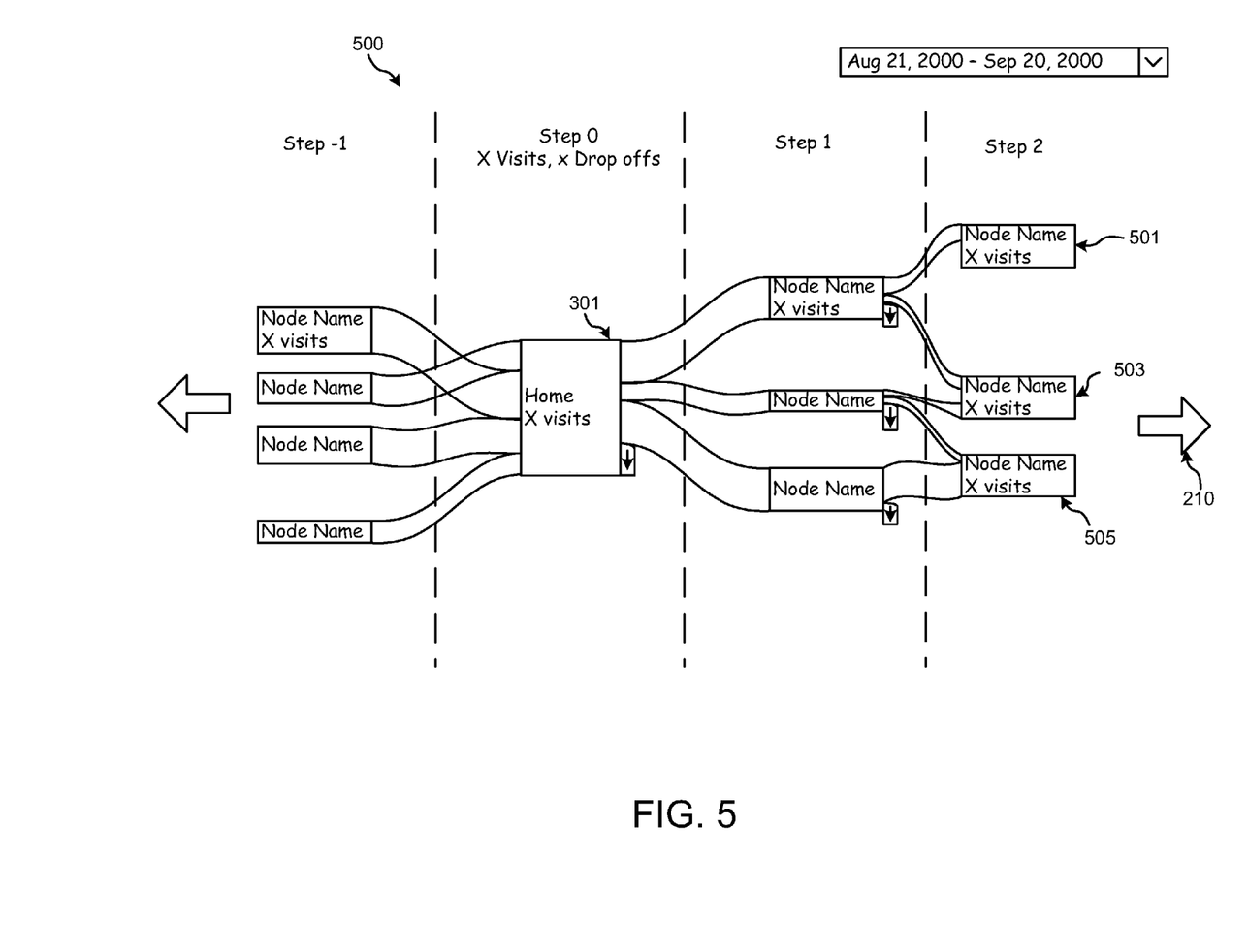
FIG. 5 is an illustration of an example visualization where the user wishes to view outbound traffic from the user select URL from FIG. 3.

FIG. 4 is an illustration of an example visualization 400 of a selected connector 310 from FIG. 3. In FIG. 4 the user had selected connector 310, causing a change in color in the selected connector. In some implementations, the color of the highlighted connector may be changed. In some implementations, the color may be darker or lighter than previously displayed. In some implementations, the color of the unselected connector may be made lighter or darker. Various other connectors that had portions of their traffic go through connector 310 are also highlighted. If the visualization 400 had more columns such as step 2 (as shown in FIG. 5), then all network traffic coming to connector 310 and traffic going away from connector 310 would be highlighted as well. In some embodiments, all traffic that generated or came from the selected connector may be highlighted. All traffic includes nodes and connectors that are more than one column away from the selected connector or node.

In visualization 400, traffic 305h is highlighted. The traffic 305h is a portion of the traffic from connector 305. Traffic 305h came from node 306 traveled through home 301 and then a portion of it went to node 311. In an example implementation, hovering over traffic 305h will display the percentage and the number of visits out of the total visits from connector 305 that went through connector 311.

In visualization 400, all of the traffic from connector 410 is highlighted because 100% of the traffic from connector 410 went to home 301 and contributed to the traffic of connector 310. In visualization 400, a portion of the traffic from connector 415 is highlighted as 415h. By hovering over 415h the user may receive more information regarding the number of visits and the percentage of visits that are being highlighted.

Moreover, each time a connector is highlighted it is possible that some of the traffic from the connector dropped off. Accordingly, a portion of drop-off 302b is highlighted because that portion of the traffic from the connector 310 dropped-off. The other portion of the traffic from the connector 310 may have visited to another node.

FIG. 5 is an illustration of an example visualization 500 of an additional set of nodes that may be visualized from FIG. 3. For example, a user may select outbound button 210 from FIG. 3. An additional outbound column labeled "step 2" may be generated. The step 2 column is two columns removed from user selected home 301 at step 0. The additional nodes 501, 503 and 505 may be repeated from the nodes from step −1. On many occasions a user may go from one node to another node and back to the original node. In this type of visualization, nodes may be repeated from one column to another. The user may choose to add additional columns by choosing outbound button 210 or inbound button 208. In some implementations, the user may add up to eleven steps in each direction before the user device requests additional traffic flow data from the performance analysis apparatus 120.

Figure 6A:
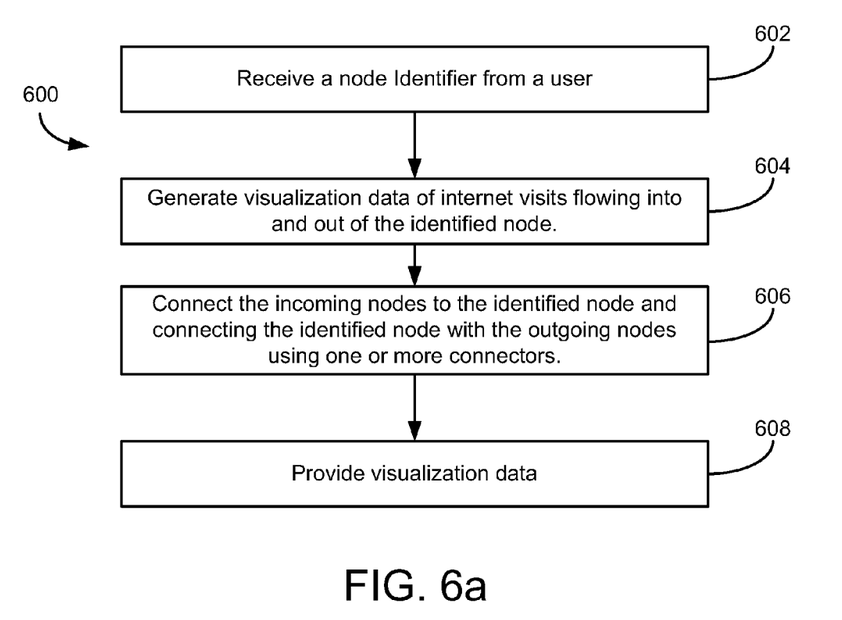
FIG. 6*a* is a process that may be implemented by the systems shown in FIGS. 1 and 7, according to an illustrative implementation.
Figure 7:
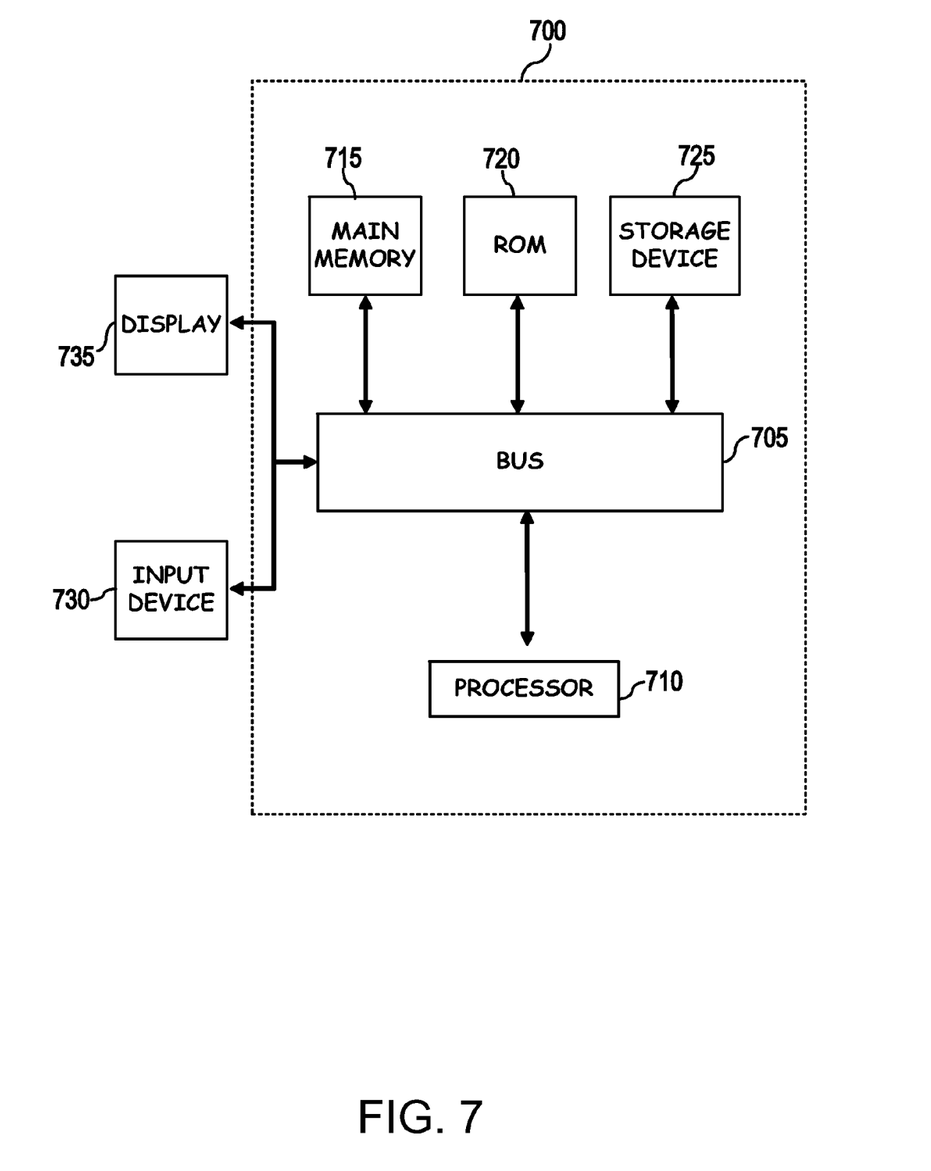
FIG. 7 is a block diagram of an example of a computer system consistent with an illustrative embodiment.

FIG. 6a is a flow diagram of an example process 600 that may be implemented by the systems shown in FIGS. 1 and 7, according to an illustrative embodiment. In some implementations, process 600 may be performed by a server that aggregates network traffic data (e.g., performance analysis apparatus 120 in FIG. 1, etc.). For example, a server may utilize process 600 to generate a visualization of the network traffic and provide visualization data to a user device. In other implementations, the network traffic data may first be downloaded to a user device that utilizes process 600 to analyze the traffic data (e.g., using one or more scripts, programs, or other routines running on the user device).

Process 600 may include receiving a node identifier from a user (block 602). In general, nodes may be any grouping of data related to the network. For example, nodes may be clusters of websites, URLs, servers, or other groups of content sources in the network. Nodes may also be based on geographic location information, demographic information, system configuration information (e.g., the hardware and/or software used to access a content source), or other information. In some implementations, nodes may be grouped based on a plurality of factors. For example, a node may be based on both geographic information and system configuration information. Traffic paths connect nodes and represent a grouping of network traffic between nodes. For example, one node may be a cluster of URLs for www.example.com and a second node may be a cluster of URLs for www.example.org. The node identifier may be selected by using menu 200 from FIG. 2.

Process 600 may include generating visualization data of network visits flowing into and out of the identified node (block 604). In general, the identified node may be placed in a column without any other nodes in the column. The column of the identified node may be labeled as "0", as shown in FIG. 3. The nodes with traffic going into the identified node may be placed in a column labeled "−1" on the left side of the identified node. The nodes that receive traffic from the identified node may be placed in a column labeled "1" on the right side of the identified node.

Process 600 may include connecting the incoming nodes to the identified node and connecting the identified node with the outgoing nodes using one or more connectors (block 606). In general the size of the connectors and the size (length or width) of the nodes is representative of the amount of traffic they received.

Process 600 may include providing the visualization data to an electronic device (block 608). In some implementations, the electronic device may be one or more electronic displays. For example, a user device that processes received network traffic data may provide the visualization data directly to an electronic display. In other implementations, the visualization data is generated by a server or other remote device and provided to a user device. The user device, in turn, may use the visualization data to cause an electronic display to display the visualization. For example, the visualization data may be generated by a server and provided to a user's computer, which then uses the visualization data to display the visualization data on a monitor.

Figure 6B:
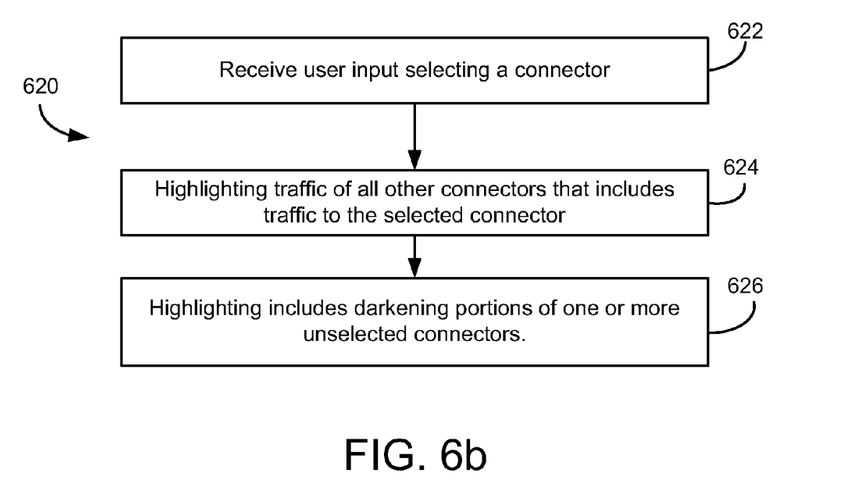
FIG. 6*b* is a process that may be implemented by the systems shown in FIGS. 1 and 7, according to an illustrative implementation.

FIG. 6b is a flow diagram of an example process 620 that may be implemented by the systems shown in FIGS. 1 and 7, according to an illustrative embodiment. In some implementations, process 620 may be performed by a server that aggregates network traffic data (e.g., performance analysis apparatus 120 in FIG. 1, etc.). For example, a server may utilize process 620 to generate a visualization of the network traffic and provide visualization data to a user device by highlighting a portion of the network traffic. In other implementations, the network traffic data may be downloaded to a user device that utilizes process 620 to highlight user selected traffic data (e.g., using one or more scripts, programs, or other routines running on the user device).

Process 620 may include receiving user input to select a connector (block 622). In general, connectors connect two nodes. For example, nodes may be clusters of websites, URLs, servers, or other groups of content sources in the network. The connectors represent network traffic to and from the nodes that are being connected.

Process 620 may highlight traffic of all other connectors that includes traffic to the selected connector (block 624). In general, highlighting may mean showing the highlighted traffic, showing the relative size compared to the unhighlighted size of the highlighted connectors. Highlighting may include displaying the amount or percentage of traffic that was received from a particular node or connector into the selected connector.

Process 620 may change the color of a portion of one or more unselected connectors (block 626). The unselected connectors with network traffic that contributed network traffic to the selected connectors will be changed in color based on the amount of traffic they contributed. (See FIG. 4) A change in color may include changing the brightness of the color. For example, the color may be darkened or lighted. The color may be changed to a different color as specified by the user in a user profile setting (i.e from blue to yellow or red or another color).

The navigation visualization may use a repetitive graph generator that receives a source node or an end node as an input. The source node may include various source types that indicates a characteristic of a device that accesses the one or more web pages. Source types may include types of traffic sources (e.g., advertisement campaigns, referring websites, etc.), system information (e.g., web browser, operating system, installed programs, screen resolution, version information, etc.), types of geographic-related information (e.g., city, language, region, country, etc.), or any other way to group the network traffic data. A source type may also be user-defined. For example, a source input may receive a selection of multiple types, such as a selection of sources broken down by region and web browser. The repetitive graph may repeat the same node in the graph. Accordingly the repetitive graph does not have connectors that go backward, because the nodes may be repeated. In other implementations a node may be combined with another node upon the user choosing to combine nodes. In other implementations the user may choose to view the details regarding a node, such as the number of web pages that have been clustered together to form the nodes.

FIG. 7 is a block diagram of an example of a computer system 700 consistent with an illustrative embodiment. The computer system 700 that can be used to provide user interaction reports, process log files, implement an illustrative performance analysis apparatus 120, and/or implement an illustrative advertisement management system 110. The computing system 700 includes a bus 705 or other communication mechanism for communicating information and a processor 710 coupled to the bus 705 for processing information. The computing system 700 also includes main memory 715, such as a random access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information, and command selections to the processor 710. In an embodiment, the input device 730 has a touch screen display 735. The input device 730 can include a cursor control, such as a mouse, a trackball, or cursor direction keys, for communicating direction information and command selections to the processor 710 and for controlling cursor movement on the display 735.

According to various embodiments, the processes that effectuate illustrative embodiments that are described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative embodiments, hard-wired circuitry may be used in place of or in combination with software instructions to implement illustrative embodiments. Thus, embodiments are not limited to any specific combination of hardware circuitry and software.

In another embodiment, instead of the user initiating a search by entering a search phrase to perform a search of a particular media type or media types, information can be pushed to the user history information. The user history information can be, for example, information corresponding to web sites visited by the user within the current user session or the last few user sessions. For example, if the user visits a first fashion handbag company web site and a second fashion handbag company web site, then advertisement data of the first and second fashion companies and other high-end handbag manufacturers can be pushed to the user when the user visits one or more of these web sites during a user session. Thus, instead of information being pulled from a user based on input by the search (e.g., a key word search input), in which relevant advertisements are matched with searched information of a particular media type, in this other embodiment, relevant advertisement information is pushed to the user based on a history of web sites which the user has visited recently. In one particular implementation of this embodiment and referring to the example above, the history information is used to push high priced handbag advertisements to the user together with search results obtained from a search request made by the user, even when the search request is unrelated to high priced handbags. So, if the user requested search results to be performed on a particular professional football team, and whereby the user had previously visited the first and second fashion handbag company web pages prior to conducting the search, relevant advertisements may be pushed to the user in a search results display screen, in which those advertisements are directed to handbags made by the first and second fashion companies that are related to the particular professional football team (e.g., have that team's logo somewhere on the handbag).

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on a non-transitory storage media, e.g., a machine-generated electrical, optical, or electromagnetic media, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated media. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, while certain embodiments have been described with respect to searching of a single media type, i.e., image search or video search, one or more embodiments are also relevant to a generic search where the search results are blended with different media types. Thus, for example, a user can type in a keyword search phrase into an Internet search engine and obtains results that contain images, video and other media types blended with text results, and in which relevant matching advertisements are obtained (and provided to the user) that match one or more of these multi-media search results. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving user input that identifies an identified node that is a grouping of one or more network resources;
generating visualization data representing Internet traffic flowing into the identified node from one or more incoming nodes and representing the Internet traffic flowing out of the identified node to one or more outgoing nodes;
connecting the one or more incoming nodes with the identified node using one or more connectors, each of the one or more connectors having a width dimension that indicates a number of visits from the corresponding incoming node to the identified node;

connecting the identified node with one or more outgoing nodes using one or more connectors, each of the one or more connectors having a width dimension that indicates a number of visits from the identified node to the corresponding outgoing node;

providing a user interface configured to:

permit the user to add additional incoming nodes representing Internet traffic flowing to the incoming nodes and to permit the user to add additional outgoing nodes representing Internet traffic flowing out of the outgoing nodes;

permit the user to receive statistical information related to Internet traffic regarding the one or more connectors or nodes based on a user device hovering over the one or more connectors or the nodes;

provide a zoom input to permit the user to:
enlarge the size of each incoming node, outgoing node or connector,
zoom out to show more incoming or outgoing nodes, and
zoom in to focus on a subset of incoming or outgoing nodes;

and to provide a scroll input to permit the user to scroll to a right or a left portion of the visualization data;

receiving user input to highlight all Internet traffic flowing through a selected node or a selected connector, wherein the selected node is an incoming node or an outgoing node, wherein the selected connector is a connector of the one or more connectors connecting the one or more incoming nodes with the identified node or a connector of the one or more connectors connecting the identified node with the one or more outgoing nodes; and highlighting a path of all Internet traffic flowing through the selected node or the selected connector, wherein the highlighted path includes a portion flowing through an unselected connector, wherein the portion of the highlighted path flowing through the unselected connector has a width dimension that indicates a number of visits to the selected node or the selected connector that flowed through the unselected connector, wherein the highlighting continues to display at least a portion of unhighlighted traffic through the unselected connector.

2. The method of claim 1, wherein the one or more incoming nodes are disposed in a first column and the one or more outgoing nodes are disposed in a second column and the user identified node is in a third column disposed between the first and the second column.

3. The method of claim 2, wherein each connector of the one or more connectors connects one or more nodes that are located in adjacent columns.

4. The method of claim 1, wherein the Internet traffic flowing into each node equals the Internet traffic flowing out of each node.

5. The method of claim 1, wherein generating visualization data comprises indicating the portion of the Internet traffic that exited one or more nodes.

6. A system for generating a visualization of Internet traffic comprising:

a first processing circuit configured to receive user input that identifies an identified node that is a grouping of one or more network resources and to receive user input to highlight all Internet traffic flowing through a selected node or a selected connector;

the first processing circuit configured to generate visualization data to send to a second processing circuit such that the second processing circuit is configured to generate a visualization that comprises:

displaying the Internet traffic flowing into the identified node from one or more incoming nodes and the Internet traffic flowing out of the identified node to one or more outgoing nodes;

connecting the one or more incoming nodes with the identified node using one or more connectors, each of the one or more connectors having a width dimension that indicates a number of visits from the corresponding incoming node to the identified node;

connecting the identified node with one or more outgoing nodes using one or more connectors, each of the one or more connectors having a width dimension that indicates a number of visits from the identified node to the corresponding outgoing node;

providing a user interface configured to:

permit the user to add additional incoming nodes representing Internet traffic flowing to the incoming nodes and to permit the user to add additional outgoing nodes representing network traffic flowing out of the outgoing nodes;

permit the user to receive statistical information related to Internet traffic regarding the one or more connectors or nodes based on a user device hovering over the one or more connectors or the nodes;

provide a zoom input to permit the user to:
enlarge the size of each incoming node, outgoing node or connector,
zoom out to show more incoming or outgoing nodes, and
zoom in to focus on a subset of incoming or outgoing nodes;

and to provide a scroll input to permit the user to scroll to a right or a left portion of the visualization data; and highlighting a path of all Internet traffic flowing through the selected node or the selected connector, wherein the selected node is an incoming node or an outgoing node, wherein the selected connector is a connector of the one or more connectors connecting the one or more incoming nodes with the identified node or a connector of the one or more connectors connecting the identified node with the one or more outgoing nodes, wherein the highlighted path includes a portion flowing through an unselected connector, wherein the portion of the highlighted path flowing through the unselected connector has a width dimension that indicates a number of visits to the selected node or the selected connector that flowed through the unselected connector, wherein the highlighting continues to display at least a portion of unhighlighted traffic through the unselected connector.

7. The system of claim 6, wherein allowing the user to add additional nodes includes the first processing circuit failing to provide additional data to the second processing unit.

8. The system of claim 6, wherein the one or more incoming nodes are disposed in a first column and the one or more outgoing nodes are disposed in a second column and the user identified node is in a third column.

9. The system of claim 8, wherein each connector of the one or more connectors connects one or more nodes located in adjacent columns.

10. The system of claim 6, wherein the visualization data comprises indicia of Internet traffic that does not go to a displayed node.

11. One or more computer-readable media having instructions stored therein, the instructions being executable by one or more processors to cause the one or more processors to perform operations comprising:

receiving user input that identifies an identified node that is a grouping of one or more Internet resources;

generating visualization data that represents Internet traffic flowing into the identified node from one or more incoming nodes and represents the Internet traffic flowing out of the identified node to one or more outgoing nodes;

connecting the one or more incoming nodes with the identified node using one or more connectors, each of the one or more connectors having a width dimension that indicates a number of visits from the corresponding incoming node to the identified node;

connecting the identified node with one or more outgoing nodes using one or more connectors, each of the one or more connectors having a width dimension that indicates a number of visits from the identified node to the corresponding outgoing node;

providing a user interface configured to:
 permit the user to add additional incoming nodes representing Internet traffic flowing to the incoming nodes and to permit the user to add additional outgoing nodes representing Internet traffic flowing out of the outgoing nodes;
 permit the user to receive statistical information related to Internet traffic regarding the one or more connectors or nodes based on a user device hovering over the one or more connectors or the nodes;
 provide a zoom input to permit the user to:
  enlarge the size of each incoming node, outgoing node or connector,
  zoom out to show more incoming or outgoing nodes, and
  zoom in to focus on a subset of incoming or outgoing nodes;
 and to provide a scroll input to permit the user to scroll to a right or a left portion of the visualization data;

receiving user input to highlight all Internet traffic flowing through a selected node or a selected connector, wherein the selected node is an incoming node or an outgoing node, wherein the selected connector is a connector of the one or more connectors connecting the one or more incoming nodes with the identified node or a connector of the one or more connectors connecting the identified node with the one or more outgoing nodes; and highlighting a path of all Internet traffic flowing through the selected node or the selected connector, wherein the highlighted path includes a portion flowing through an unselected connector, wherein the portion of the highlighted path flowing through the unselected connector has a width dimension that indicates a number of visits to the selected node or the selected connector that flowed through the unselected connector, wherein the highlighting continues to display at least a portion of unhighlighted traffic through the unselected connector.

* * * * *